United States Patent
McGinn

(10) Patent No.: US 7,209,554 B2
(45) Date of Patent: Apr. 24, 2007

(54) RINGING CONTROLLER

(75) Inventor: S. Donald McGinn, Ashton (CA)

(73) Assignee: Ciena Corporation, Linthicum, MD (US)

( * ) Notice: Subject to any disclaimer, the term of this patent is extended or adjusted under 35 U.S.C. 154(b) by 520 days.

(21) Appl. No.: 10/281,406

(22) Filed: Oct. 24, 2002

(65) Prior Publication Data
US 2003/0118157 A1 Jun. 26, 2003

(30) Foreign Application Priority Data
Oct. 24, 2001 (CA) .................................. 2360117

(51) Int. Cl.
*H04M 1/00* (2006.01)
*H04M 9/00* (2006.01)

(52) U.S. Cl. ..................... 379/413.01; 379/102.04; 379/322

(58) Field of Classification Search ............ 379/413.01
See application file for complete search history.

(56) References Cited

U.S. PATENT DOCUMENTS

| 4,224,476 | A |   | 9/1980  | Tuhy et al. |
|-----------|---|---|---------|-------------|
| 4,686,383 | A | * | 8/1987  | Croft ........................ 327/198 |
| 4,955,053 | A |   | 9/1990  | Siegmund |
| 5,323,461 | A | * | 6/1994  | Rosenbaum et al. ... 379/399.01 |
| 5,406,623 | A |   | 4/1995  | Rovik |
| 5,579,196 | A | * | 11/1996 | Pezzini ....................... 361/86 |
| 6,078,593 | A |   | 6/2000  | Eames et al. |
| 6,137,189 | A | * | 10/2000 | Youngblood ................. 307/30 |
| 6,233,335 | B1 |   | 5/2001  | Ludeman |
| RE37,281  | E  | * | 7/2001  | Motegi ................ 340/636.15 |
| 6,456,712 | B1 |   | 9/2002  | Hein et al. |
| 6,510,204 | B2 |   | 1/2003  | De Clercq et al. |
| 6,580,793 | B1 | * | 6/2003  | Dunn et al. ............ 379/406.04 |
| 6,813,340 | B1 | * | 11/2004 | Issaa et al. ................... 379/31 |
| 2003/0011430 | A1 | * | 1/2003 | Kruiskamp ................ 330/253 |

FOREIGN PATENT DOCUMENTS

EP 0 748143 A2 * 12/1987

OTHER PUBLICATIONS

International Search Report for PCT/US02/34239.

* cited by examiner

*Primary Examiner*—Fan Tsang
*Assistant Examiner*—Ramnandan Singh
(74) *Attorney, Agent, or Firm*—Merek, Blackmon & Voorhees, LLC

(57) ABSTRACT

In a telecommunications system, a switching device selectively applies one of two different voltage supplies to a common node. A first of the voltage supplies is coupled to the common node by a first switch and a second of the voltage supplies is coupled to the common node by a second switch. The switching device includes the following elements. A difference detector detects a difference between the first and second voltage supplies. A control circuit selectively enables one of the first and second switches and disables the other of the first and second switches, for switching between the first and second voltage supplies in response to the difference detector. The control circuit performs the switching between the first and second voltage supplies when the detected difference falls below a predetermined threshold.

24 Claims, 2 Drawing Sheets

RINGING CONTROLLER

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The invention relates to the field of ringing controllers, more specifically to ringing controllers that provide reduced noise switching between battery feed and ringing states.

With increased demand to deliver high-speed data services to subscribers, many techniques have been developed to use existing telephone loops to carry digital subscriber line (DSL) signals simultaneously with normal voice-band telephony services. Generally, the signals associated with plain old telephone service (POTS), such as on-hook and off-hook transitions and ringing, generate high noise levels at frequencies above the voice band and are thus incompatible with high-speed DSL signals. Traditionally, large and costly filters, often referred to as POTS splitters, have been employed at the telephone equipment location to remove POTS-created noise from the data band. This requirement has been an impediment to the large-scale deployment of DSL services.

The generally-accepted method of alerting a subscriber that an incoming telephone call has arrived is to apply a high magnitude alternating current (AC) waveform to the subscriber loop in order to ring a bell or similar audible alerting device at the subscriber's premises. One very common standard in North America is to use 86 V rms AC signals with a frequency of 20 Hz, although other different voltages and frequencies can be employed. This AC waveform is often referred to as the power-ringing signal.

The process of ringing a subscriber's line can be considered as a cycle between two states. First, the state of providing a battery feed to the loop to await activity, which may include on-hook transmission or supervision. Second, the state of providing the power-ringing signal to the loop. Digital Subscriber Loop (DSL) signals require very good signal-to-noise ratios (SNRs) to achieve the high throughputs required by the applicable DSL standards and hence are quite susceptible to noise, both in the time and frequency domains. Hence, it is desirable that transitions between the battery feed and ringing states cause a minimum amount of noise.

Traditionally, mechanical relays have been employed to switch ringing signals onto the subscriber loop. It is an unfortunate characteristic of relays that they tend to introduce discontinuities onto the loop voltage due to timing variations, abrupt switching behavior, contact bounce, or open-circuit intervals between states. Large voltage discontinuities manifest themselves as high frequency noise, which interfere with DSL signals.

More recently, solid state relays have been employed to switch ringing signals but, as yet, their timing and transition characteristics have tended to induce noise levels incompatible with DSL.

It is desirable that the change between the battery feed state and the ringing state be continuous and smooth to avoid creating noise artifacts that interfere with DSL transmission. A need therefore exists for a ringing controller that will allow for reduced noise switching between battery feed and ringing states. Consequently, it is an object of the present invention to obviate or mitigate at least some of the above-mentioned disadvantages.

BRIEF SUMMARY OF THE INVENTION

In accordance with an aspect of the present invention, there is provided a switching device for selectively applying one of two different voltage supplies to a common node. A first of the voltage supplies is coupled to the common node by a first switch and a second of the voltage supplies is coupled to the common node by a second switch. The switching device includes the following elements. A difference detector detects a difference between the first and second voltage supplies. A control circuit selectively enables one of the first and second switches and disables the other of the first and second switches, for switching between the first and second voltage supplies in response to the difference detector. The control circuit performs the switching between the first and second voltage supplies when the detected difference falls below a predetermined threshold.

BRIEF DESCRIPTION OF THE DRAWINGS

Embodiments of the present invention will now be described by way of example only with reference to the following drawings in which.

DETAILED DESCRIPTION OF THE INVENTION

Figure 1:
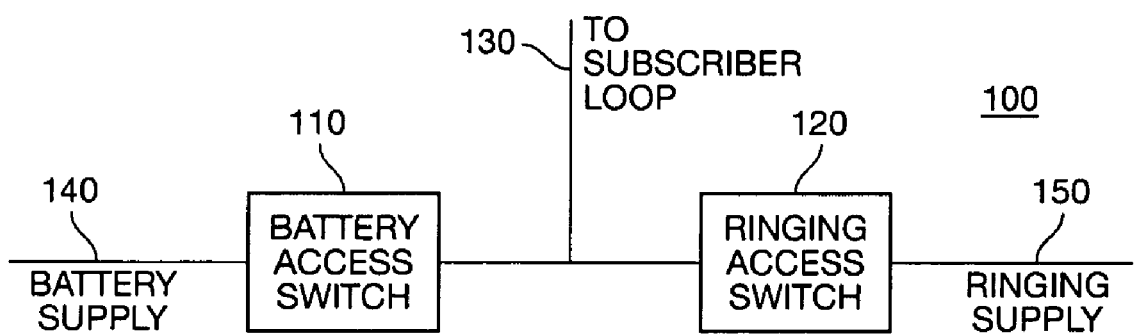
FIG. 1 is a high-level block diagram illustrating a ringing controller in accordance with an embodiment of the invention.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. In the drawings, like numerals refer to like structures or processes.

In general, the ringing controller described herein features reduced noise switching between battery feed and ringing states. Referring to FIG. 1, a ringing controller is illustrated generally by numeral 100. The ringing controller 100 includes a battery access switch 110 and a ringing access switch 120. The battery access switch 110 couples a subscriber loop 130 to a battery supply 140 (or talk battery) that provides normal direct current (DC) voltage. Typically, the talk battery is a nominal −48 VDC. The ringing access switch 120 couples the subscriber loop 130 to a ringing supply 150 that provides a power ringing signal. In general, when it is necessary to ring the subscriber's telephone, the battery access switch 110 is opened, removing the normal DC battery supply 140 from the loop 130, and the ringing access switch 120 is closed, thus applying the power of the ringing supply 150 to the loop 130. At the end of the power-ringing burst, this sequence is reversed.

In the present embodiment, both the battery access switch 110 and ringing access switch 120 are electronic and thus are free from many of the disadvantages of the mechanical relays that are traditionally used. Furthermore, the switches are constructed and controlled in a manner that renders them less noisy than existing solid-state implementations as will be described in detail later in the description.

Figure 2:
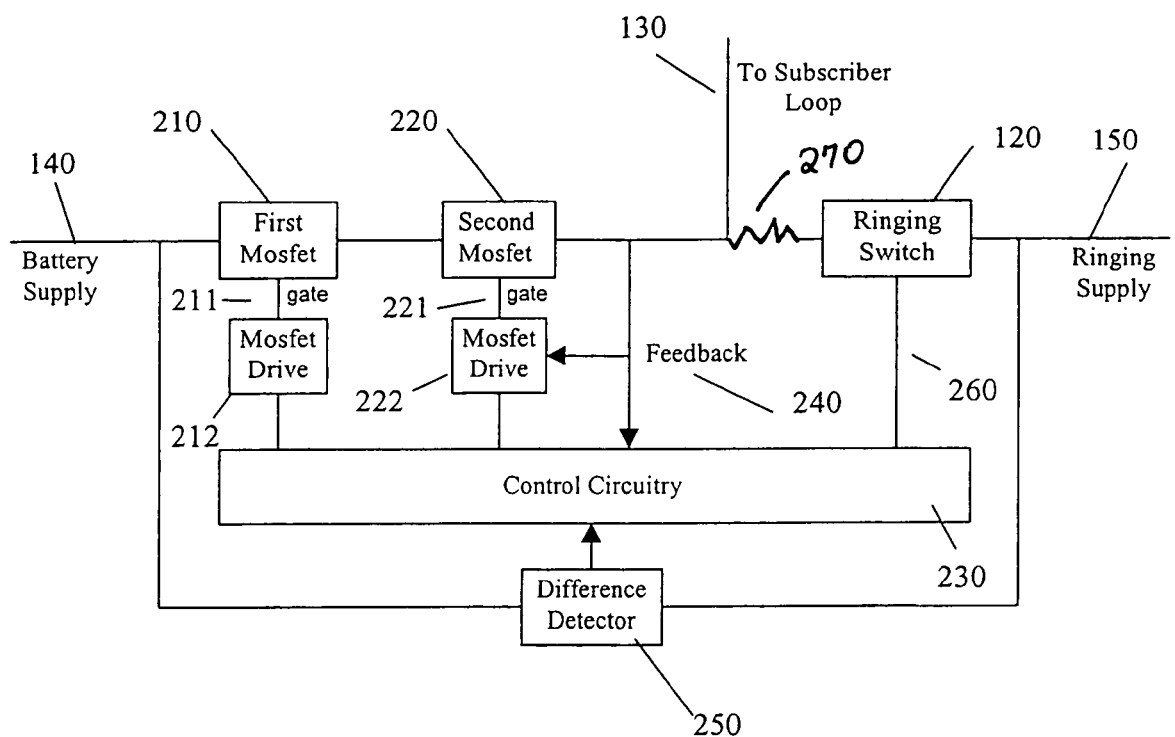
FIG. 2 is a detailed block diagram illustrating a ringing controller in accordance with an embodiment of the invention.

Referring to FIG. 2, a detailed block diagram of a ringing controller in accordance with an embodiment of the invention is illustrated generally by numeral 200. In this embodiment, a commercially available, solid state relay is employed as the ringing access switch 120. The battery access switch 110 includes first 210 and second 220 MOSFET transistors, first 212 and second 222 drive circuits, a control circuit 230, and a difference detector 250.

The MOSFET transistors 210 and 220 are coupled in series between the battery supply 140 and the loop 130. Each of the drive circuits 212 and 222 is coupled between the control circuit 230 and an associated one of the MOSFETs 210 and 220. The control circuit 230 is further coupled to the ringing access switch 120 and the difference detector 250. The difference detector 250 is further coupled to the ringing supply 150 and the battery supply 140.

The two-transistor 210 and 220 configuration is used because each transistor is used to block only one voltage polarity of the power ringing signal. Thus, to block an AC waveform, two transistors 210 and 220 are used, one for each polarity. The use of direct drive circuits 212 and 222, coupled between the MOSFETs 210 and 220 and the control circuitry 230, allows more control over MOSFET switching behavior. Through the control circuitry 230, the timing of the MOSFET drive signals 211 and 221 is linked to the timing of the power ringing signal waveform 150 and to the timing of the drive signal 260 to the ringing access switch 120.

Furthermore, the drive circuits 212 and 222 are arranged such that the MOSFETs 210 and 220 can be linearly controlled while in a battery access state. By this arrangement, the DC current flowing in the loop 130 may be controlled by appropriately driving the MOSFETs 210 and 220. Hence, the battery access switch 110 may be used either as a switch or as a linear control element, as will be described in detail. Further, the drive circuits 212 and 222 allow feedback 240 to be used to modify the AC and DC characteristics of the battery access switch 110 when in battery feed mode and also to control its dynamic switching behavior, thus controlling its noise performance.

To control switching noise, it is preferable that the transition from battery voltage 140 to ringing voltage 150 occurs when the two voltages 140 and 150 are equal, that is, at the "zero crossing". To that end, the difference detector 250 senses the difference between the battery 140 and ringing 150 voltages, and the control circuit 230 uses the difference for controlling the switching process.

The operation of the ringing controller 200 will now be described, firstly with respect to the removal of the battery voltage and the application of ringing voltage, and secondly with respect to the removal of ringing voltage and the application of the battery voltage.

To initiate a power ringing burst, the control circuit 230 awaits the condition when the ringing supply 150 and battery supply 140 voltages are approximately equal. Both of the MOSFETs 210 and 220 are in an "on" state. When the two voltages 140 and 150 are close, the ringing application operation begins. Both of the MOSFETs 210 and 220 are turned "off" by removing their respective drive signals 211 and 221. A drive signal 260 for the ringing access switch 120 is enabled, thus applying ringing to the loop 130.

The timing of these events is such that the ringing access switch 120 begins conduction slightly before the battery access switch 110 turns off, thus avoiding periods of time when a high impedance is present to both the battery and ringing supplies 140 and 150. Such time periods could cause discontinuities in the output voltage, depending on the loop conditions present at that particular time. The control circuit 230 is designed such that the moment of switchover occurs very close in time to the actual zero crossing. Therefore, if the drive circuits 212 and 222, the MOSFETs 210 and 220, or the ringing switch 120 possess any inherent delays, the control circuitry 250 compensates by initiating the ringing application process prior to the zero crossing.

The drive circuits 212 and 222 and the feedback 240 are arranged such that the MOSFETs 210 and 220 do not turn off abruptly. That is, the drive and control circuitry is sensitive to the rate of change and shape of the transition waveform. If, for example, it is detected that the transition waveform begins to occur too quickly, the control and drive circuits react by slowing down the rate at which the MOSFETs 210 and 220 turn off. This is achieved by decreasing the rate at which the drive signals 211 and 221 are removed from the MOSFETs 210 and 220, effectively providing a temporary increase in gate drive. Thus, the transition between the conducting and non-conducting states of the MOSFETs 210 and 220 occurs smoothly and continuously over a short time interval, ensuring that the transition to ringing occurs with little or no discontinuities.

The smooth, continuous transition also ensures the entire circuit 200 will be reasonably immune to uncertainties in the relative voltage levels of the battery 140 and ringing 150 supplies at the moment of ringing application. These uncertainties may be due to timing errors and component variations. Consequently, the difference detector 250 and the timing of the control circuit 230 need not be exact, and switching noise levels can be sufficiently reduced to not interfere with DSL signals.

Typically, the removal of ringing presents the greater noise reduction challenge due to ringing currents that may be flowing in the subscriber loop 130 at the instant of ringing removal. If any reactive elements are present anywhere in the ringing path, including a line card itself, then spikes or other discontinuities may result from an attempt to interrupt the ringing signal, thus creating a large-amplitude noise event.

To remove the power-ringing signal 150, a sequence resembling the inverse of the ringing application sequence described above is followed. The control circuit 230 awaits the condition where the battery supply 140 and ringing supply 150 voltages are approximately equal. When the voltages are close, as indicated by the difference detector, the ringing removal operation begins. Both the MOSFETs 210 and 220 are turned "on" by applying drive signals 211 and 221 to their gate terminals. The drive signal 260 for the ringing access switch 120 is removed, beginning the process of removing ringing from the loop.

The timing of these events is arranged such that the battery access switch 110 begins conduction slightly before the ringing access switch 120 turns off. This maintains a continuous current path during the transition, avoiding large voltage transients from reactive loads. The control circuit 230 is designed such that the moment of switchover occurs very close in time to the actual zero crossing. Therefore, if drive circuits 212 and 222, the MOSFETs 210 and 220, or the ringing switch 120 possess any inherent delays, the control circuit 230 compensate by initiating the ringing application process prior to the zero crossing.

The drive circuits 212 and 222 and the feedback 240 are arranged such that the MOSFETs 210 and 220 do not turn on abruptly. As described above, the drive and control circuitry is sensitive to the rate of change and shape of the transition waveform. If, for example, it is detected that the transition waveform begins to occur too quickly, the control and drive circuits react by slowing down the rate at which the MOSFETs 210 and 220 turn on. This is achieved by decreasing the rate at which the drive signals 211 and 221 are applied to the MOSFETs 210 and 220, effectively providing a temporary decrease in gate drive. Thus, the transition between the non-conducting and conducting states of the MOSFETs 210 and 220 occurs smoothly and continuously over a short time interval, thus ensuring that the transition to battery feed occurs with little or no discontinuities.

The smooth, continuous transition also ensures the entire circuit 200 is reasonably immune to uncertainties in the relative voltage levels of the battery 140 and ringing 150 supplies during the switch from ringing application. Again, these uncertainties may be due to timing errors and component variations. Consequently, the difference detector 250 and the timing of the control circuit 230 need not be exact in order for switching noise levels to be sufficiently reduced to not interfere with DSL signals.

During both the transition from battery feed to ringing and the transition from ringing to battery feed, there is a short period of time during which both the battery access switch 110 and the ringing access switch 120 conduct simultaneously. This ensures a seamless transition between ringing and normal battery feed. This simultaneous conduction is often referred to as a "make-before-break" operation and may be accomplished using certain mechanical relays. Mechanical relays, however, tend to exhibit wide variations in the timing of their operation and generally also possess contact bounce and abrupt switching transitions, both of which contribute to high noise levels during the switching process. The electronic switching circuit described in the present invention is more precise and predictable in its operation. Moreover, the effects of component tolerances may be modeled using common simulation techniques to ensure controlled switching behavior over a range of circuit parameters and component tolerances.

During the simultaneous conduction interval described above, it is possible for current to flow between the battery 140 and ringing 150 supplies. It may, therefore, be necessary to control or limit the current flowing through the two switches 110 and 120 for this time interval. Current limiting may be accomplished with a resistor 270 coupled in series with the ringing access switch 120. Other known current limiting devices may also be used. The battery access switch 110 is a low resistance or "strong" switch while the ringing access switch 120 is a high resistance or "weak" switch. Consequently, the battery access switch 110 "overrides" the ringing access switch 120 thus ensuring that only the battery access switch 110 and its feedback 240 control the transition between states of the ringing controller 200.

Through the control circuit 230, the behavior of the battery access switch 110 is closely controlled. This allows for precise control of the state transitions of the ringing controller 200 state transitions. As a result, switching between the ringing and battery supplies is performed when their voltages are approximately equivalent, reducing switching noise. Further, the switching device described herein provides a smooth transition between the ringing and battery supplies, reducing switching discontinuities that are introduced by other switching devices. Thus, implementing a switching device in accordance with the present invention reduces interference with DSL transmissions that has traditionally been associated with switching between a battery supply and a ringing supply.

As previously mentioned, the battery access switch 110 may be used either as a switch or as a linear control element. Thus, the battery access switch 110 may be used for additional applications. For example, it may be used to control current in the loop 130. By not turning the battery switch 110 fully on, power can be saved in short loops by reducing current flow. In addition, through the use of feedback 240, the impedance of the battery switch 110 may be controlled, which can be useful for impedance balancing.

In summary, the battery switch described above may be controlled in a linear manner as well as in a switching manner. Feedback techniques are employed to control the battery access switch behavior in both the time and frequency domains. A difference detector is coupled between the battery and ringing voltage supplies and the timing of ringing application and removal is coordinated with respect to the ringing waveform so that transitions are as smooth as possible. A common-conduction interval eliminates transients due to reactive load switching. Generally, the battery access switch overrides the ringing access switch, thus controlling the state transition. Further, the switches function without interfering with DSL signals, thus eliminating one cause for bulky and expensive filters or POTS splitters.

While the above description has been made with specific reference to MOSFET and technology and solid state relays, it will become apparent to a person skilled in the art that other switching technology may be used. Thus, although the invention has been described with reference to certain specific embodiments, various modifications thereof will be apparent to those skilled in the art without departing from the spirit and scope of the invention as outlined in the claims appended hereto.

What is claimed is:

1. In a telecommunications system, a switching device for selectively applying one of two different voltage supplies to a common node, a first of said two different voltage supplies having a DC voltage supply and being coupled to said common node by a first switch and a second of said two different voltage supplies having an AC voltage supply and being coupled to said common node by a second switch, said switching device comprising:
    a difference detector that detects a difference between said first and second voltage supplies; and
    a control circuit that selectively enables one of said first and second switches and disables another of said first and second switches for switching between said first and second voltage supplies in response to said difference detector,
    wherein said control circuit enables switching between said first and second voltage supplies when said difference falls below a predetermined threshold.

2. A switching device as defined in claim 1, wherein said switching device is a ringing controller and said common node is a transmission loop.

3. A switching device as defined in claim 2, wherein said first voltage is a battery supply and said second voltage is a ringing supply.

4. A switching device as defined in claim 3, wherein said second switch comprises a solid-state relay.

5. A switching device as defined in claim 3, wherein said first switch comprises: two transistors, wherein said two transistors are coupled serially.

6. A switching device as defined in claim 5, wherein each of said two transistors is coupled to an associated drive circuit for controlling a level of conduction of each of said two transistors.

7. A switching device as defined in claim 6, wherein both of said associated drive circuits turn "on" said two transistors for delivering said battery supply to said transmission loop.

8. A switching device as defined in claim 6, wherein both of said first and second switches are "on" for a predetermined length of time.

9. A switching device as defined in claim 6, wherein said level of conduction of each of said two transistors is limited by both of said associated drive circuits on short loops for reducing power dissipation.

10. A switching device as defined in claim 5, wherein said first switch further comprises: a resistor, coupled serially with said two transistors, that limits current through said first switch.

11. A switching device as defined in claim 1, wherein said predetermined threshold is approximately zero.

12. A switching device as defined in claim 1, wherein at least one of said two different voltage supplies is a battery.

13. In a telecommunications system, a ringing controller for selectively applying one of two different voltage supplies to a transmission loop, a first of said two different voltage supplies being a battery supply and a second of said two different voltage supplies being a ringing supply, said ringing controller comprising:
  a first switch that couples said battery supply to said transmission loop;
  a second switch that couples said ringing supply to said transmission loop;
  a difference detector means for detecting a difference between said first and second voltage supplies; and
  a control means for selectively enabling one of said first and second switches and disabling another of said first and second switches for switching between said first and second voltage supplies in response to said difference detector means,
  wherein said control means enables switching between said first and second voltage supplies when said difference falls below a predetermined threshold.

14. A switching device as defined in claim 13, wherein said first switch comprises: two transistors, wherein said two transistors are coupled serially.

15. A switching device as defined in claim 14, wherein each of said two transistors is coupled to an associated drive circuit for controlling a level of conduction of each of said two transistors.

16. A switching device as defined in claim 15, wherein both of said associated drive circuits turn "on" said two transistors for delivering said battery supply to said transmission loop.

17. A switching device as defined in claim 15, wherein both of said first and second switches are "on" for a predetermined length of time.

18. A switching device as defined in claim 15, wherein said level of conduction of each of said two transistors is limited by both of said associated drive circuits on short loops for reducing power dissipation.

19. A switching device as defined in claim 14, wherein said first switch further comprises: a resistor, coupled serially with said two transistors, that limits current through said first switch.

20. A switching device as defined in claim 13, wherein said predetermined threshold is approximately zero.

21. A switching device as defined in claim 13, wherein at least one of said two different voltage supplies is a battery.

22. In a telecommunications system, a method of selectively applying one of two different voltage supplies to a common node, a first of said voltage supplies having a constant voltage being coupled to said common node by a first switch and a second of said voltage supplies having a variable voltage being coupled to said common node by a second switch, said method comprising the steps of:
  detecting a difference between said first voltage supply and said second voltage supply; and
  selectively enabling one of said first and second switches and disabling another of said first and second switches for switching between said first and second voltage supplies in response to said difference,
  wherein switching between said first and second voltage supplies occurs when said difference falls below a predetermined threshold.

23. A switching device as defined in claim 22, wherein said predetermined threshold is approximately zero.

24. A switching device as defined in claim 22, wherein at least one of said two different voltage supplies is a battery.

* * * * *